United States Patent
Ohshiro

(10) Patent No.: US 9,827,702 B2
(45) Date of Patent: Nov. 28, 2017

(54) INJECTION MOLDING MACHINE

(71) Applicant: FANUC Corporation, Yamanashi (JP)

(72) Inventor: Katsufumi Ohshiro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/919,214

(22) Filed: Oct. 21, 2015

(65) Prior Publication Data

US 2016/0114510 A1    Apr. 28, 2016

(30) Foreign Application Priority Data

Oct. 22, 2014   (JP) .................................. 2014-215548

(51) Int. Cl.
B29C 45/78    (2006.01)
B29C 45/84    (2006.01)
B29C 45/17    (2006.01)

(52) U.S. Cl.
CPC .......... *B29C 45/84* (2013.01); *B29C 45/1777* (2013.01); *B29C 45/1753* (2013.01)

(58) Field of Classification Search
CPC .. B29C 45/84; B29C 45/1777; B29C 45/1753
USPC ........ 425/151, 169, 171, 173, 567, 569, 574
See application file for complete search history.

(56) References Cited

U.S. PATENT DOCUMENTS 5,460,505 A    10/1995   Ito et al.

FOREIGN PATENT DOCUMENTS

| JP | 62-60311 U | 4/1987 | |
| JP | 3-100704 U | 10/1991 | |
| JP | 5-79338 U | 10/1993 | |
| JP | 5-329899 A | 12/1993 | |
| JP | 6-328527 A | 11/1994 | |
| JP | 9-153307 A | 6/1997 | |
| JP | 2002-301557 A | 10/2002 | |
| JP | 2005-297528 A | 10/2005 | |
| JP | 2009-54500 A | 3/2009 | |
| JP | 2014-162173 | * 9/2014 | ............ B29C 43/17 |
| JP | 2014-162173 A | 9/2014 | |

OTHER PUBLICATIONS

English translation of JP2014-162173. Sep. 2014.*
Office Action in JP Application No. 2014-215548, dated Dec. 15, 2015.

* cited by examiner

*Primary Examiner* — Joseph S Del Sole
*Assistant Examiner* — Thukhanh T Nguyen
(74) *Attorney, Agent, or Firm* — Hauptman Ham, LLP

(57) ABSTRACT

An injection molding machine includes a resin scattering preventing cover configured to prevent resin scattering from injection nozzle fixed to an end of an injection unit, a lighting unit configured to molding contact portion where the injection nozzle and a mold contact, a fixing unit configured to fix the lighting unit, and an opening/closing portion where the resin scattering prevention cover is configured to open and close; wherein the fixing unit is connected interlocked with opening and closing of the opening/closing portion.

4 Claims, 6 Drawing Sheets

INJECTION MOLDING MACHINE

RELATED APPLICATIONS

The present application claims priority to Japanese Application Number 2014-215548, filed Oct. 22, 2014, the disclosure of which is hereby incorporated by reference herein in its entirety.

BACKGROUND OF THE INVENTION

1. Field of the Invention

The present invention relates to an injection molding machine, and more specifically to a resin scattering preventing cover providing lighting to around a nozzle and molding touching portion.

2. Description of the Related Art

Purge of resin in a heating tube is performed when an injection molding machine is stopped, color is changed, or resin is changed, during injection molding. There is a possibility that the resin is popped out from the end of the nozzle, influenced by gas in the heating tube or release of residual pressure, since the purge is performed while the top end of the nozzle does not touch the mold. Therefore, there is an injection molding machine in which a resin scattering preventing cover, covering the top end of the nozzle for protecting the operator from the scattering of the resin, is attached. The resin scattering preventing cover is usually attached to a stationary platen with configuration of covering a broad space of the top end of the heating tube including the top end of the nozzle, however there has been a problem that interior portion of the set resin scattering preventing cover is dark and it is difficult to confirm status of the mold touching portion.

Japanese Patent Laid-Open No. 2005-297528 proposes to set a fluorescent light as a lighting unit on the ceiling of the vacuum vessel, such that the mold and the like are brightly lightened.

Japanese Patent Laid-Open No. 6-328527 proposes a lighting in the neighborhood of the injection nozzle for obtaining a vivid image by the video camera.

Japanese Patent Laid-Open No. 2014-162173 discloses an injection molding machine, lighting contact portion of the injection nozzle and the mold.

It is impossible in Japanese Patent Laid-Open No. 2005-297528 for the light on the ceiling to lighten the interior portion of the resin scattering preventing cover around the nozzle and to lighten the touching portion of the nozzle as in the present invention.

It is impossible in Japanese Patent Laid-Open No. 6-328527 to protect the lighting from the influence of the heat of scattered resin injected from the nozzle and the heating tube.

There is a possibility in Japanese Patent Laid-Open No. 2014-162173 that the resin scattering preventing cover interferes with the lighting unit when the resin scattering preventing cover is open or closed dependent on the set position of the lighting unit.

As a method for lighting the touching portion of the mold, a method of setting a lighting 1A above the injection molding machine, and a method of setting a lighting 1B is in the neighborhood of the touching portion of the mold, as shown in FIG. 2, are proposed.

However, it is impossible when a lighting 1A is set above the injection molding machine, to lighten the touching portion of the mold since the light is shielded by the resin scattering preventing unit. When a lighting 1B is set in the neighborhood of the touching portion of the mold, a unit such as a protection cover is necessary since it is impossible to protect the lighting from influence of heat of the heating tube and scattering of molten resin, and disposal operation is difficult when the lighting is damaged during molding.

Furthermore, the resin scattering preventing cover attached to the stationary platen as a safety cover when the molten resin is purged in the injection molding machine is proposed, but there is a problem in the resin scattering preventing cover in the prior art that it is difficult to confirm the touching portion of the mold since the interior portion inside the cover is dark.

SUMMARY OF THE INVENTION

In view of the above-described problems in the prior art techniques, the present invention can lighten the interior portion inside the resin scattering preventing cover while protecting the lighting from the influence of heat of the heating tube and scattered resin by setting the lighting outside the resin scattering preventing cover.

The injection molding device according to the present invention includes a resin scattering preventing cover configured to prevent resin scattering from an injection nozzle fixed to an end of an injection unit, a lighting unit configured to lighten molding contact portion where the injection nozzle and a mold contact, a fixing unit configured to fix the lighting unit, and an opening/closing portion where the resin scattering prevention cover is configured to open and close; wherein, the fixing unit is connected interlocked with opening and closing of the opening/closing portion.

The resin scattering preventing cover configured to open and close includes the lighting unit configured to lighten the mold touching portion and the internal portion of the resin scattering preventing cover in the lighting unit, and the attached lighting unit, interlocked with the resin scattering preventing cover, does not prevent opening/closing motion of the resin scattering preventing cover.

The lighting unit may be provided on outside part of the resin scattering preventing cover.

The lighting unit is provided outside the resin scattering preventing cover such that the lighting is protected from the influence of the heat from the heating tube and scattered resin.

The fixing unit and the opening/closing portion may be disconnectably connected to each other.

The lighting attached to the resin scattering preventing cover can be disconnected, in order not to prevent confirmation work of the molding touching portion and the interior portion of the resin scattering preventing cover by the operator such that the disconnected lighting lightens any portion.

An injection molding machine may include a guide unit configured to restrict moving region of the lighting unit to an area other than the opening/closing portion of the resin scattering prevention cover, and a guided unit with which the lighting unit or the fixing unit guides the guide unit, wherein the guided unit is configured to be guided by the guide unit when the opening/closing portion is open or closed such that the fixing unit and the lighting unit are moved.

The lighting attached to the resin scattering preventing cover moves along the guided unit, such that the lighting moves along a track which the operator intends.

An injection molding machine may include a lighting and extinction command unit for commanding lighting and extinction of the lighting unit, configured to command lighting and extinction to the lighting unit inter-connectedly with back and forward motion of the injection unit.

Lighting is provided if needed even when the operator intends to, since the lighting is turned on and off automatically and inter-connectedly with back and forward motion of the injection unit. Thus the work is performed smoothly and the operator does not forget to turn off the lighting.

The present invention, with the configuration mentioned above, securely lightens the interior portion of the resin scattering preventing cover and the mold touching portion, without preventing the opening and closing of the resin scattering preventing cover since the lighting is attached such that the lighting is configured to be moved interlocking with the resin scattering preventing cover, configured to be lightened. In addition to that, the lighting is set not preventing work of the operator by being attached easily detachably from the resin scattering preventing cover, such that the restriction of the arrangement of the lighting unit is released.

The lighting is attached outside the resin scattering preventing cover for protecting the lighting from the heat or the molten resin, such that damage of the lighting is prevented. Furthermore, the lighting is lightened without waste and the lifetime of the lighting is elongated, since the lighting is configured to be turned on and off interlockedly with the forward and backward movement of the injection unit.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
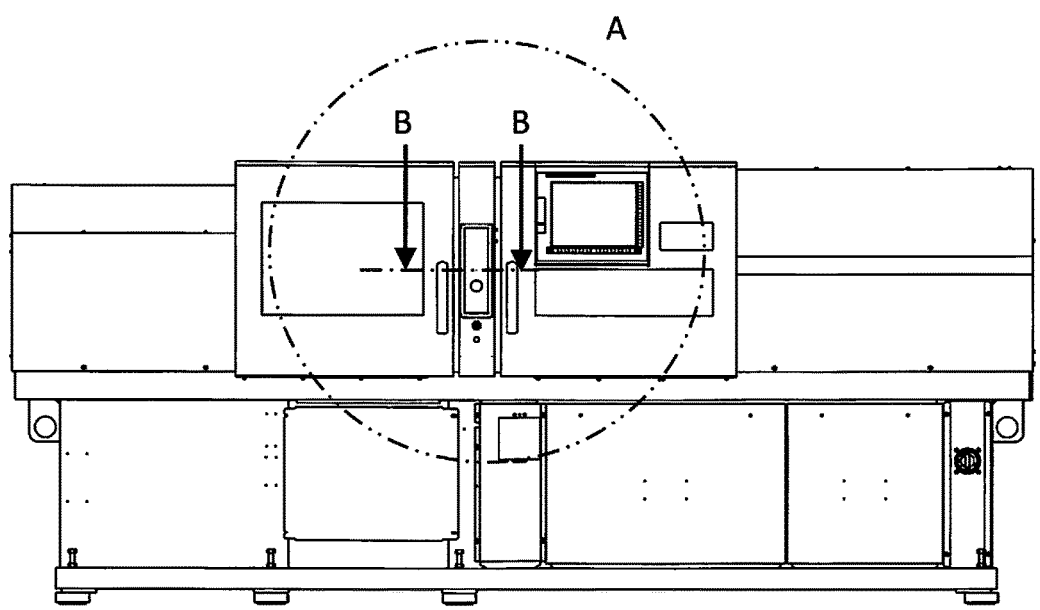
FIG. 1 is a diagram showing an implementation example of a molding machine.
Figure 2:
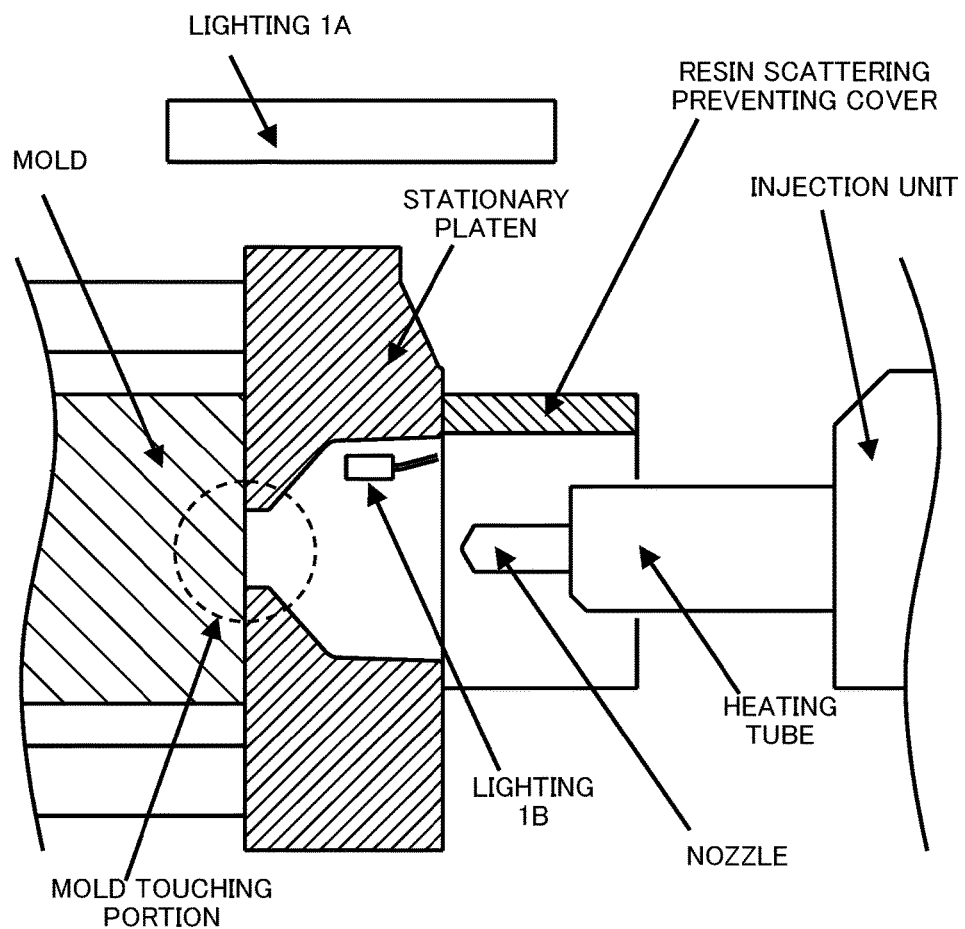
FIG. 2 is a diagram showing lighting and a resin scattering preventing cover (Details A) in the prior art.
Figure 3:
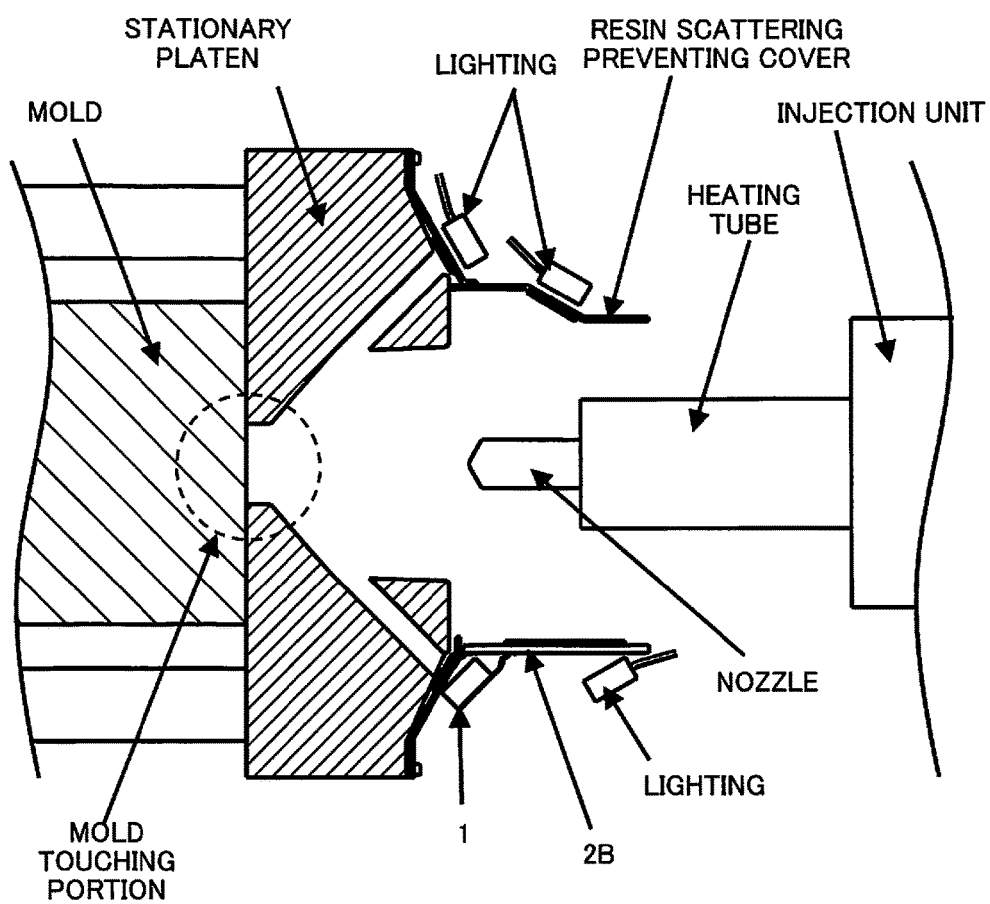
FIG. 3 is arrangement relation diagram around a nozzle.
Figure 4:
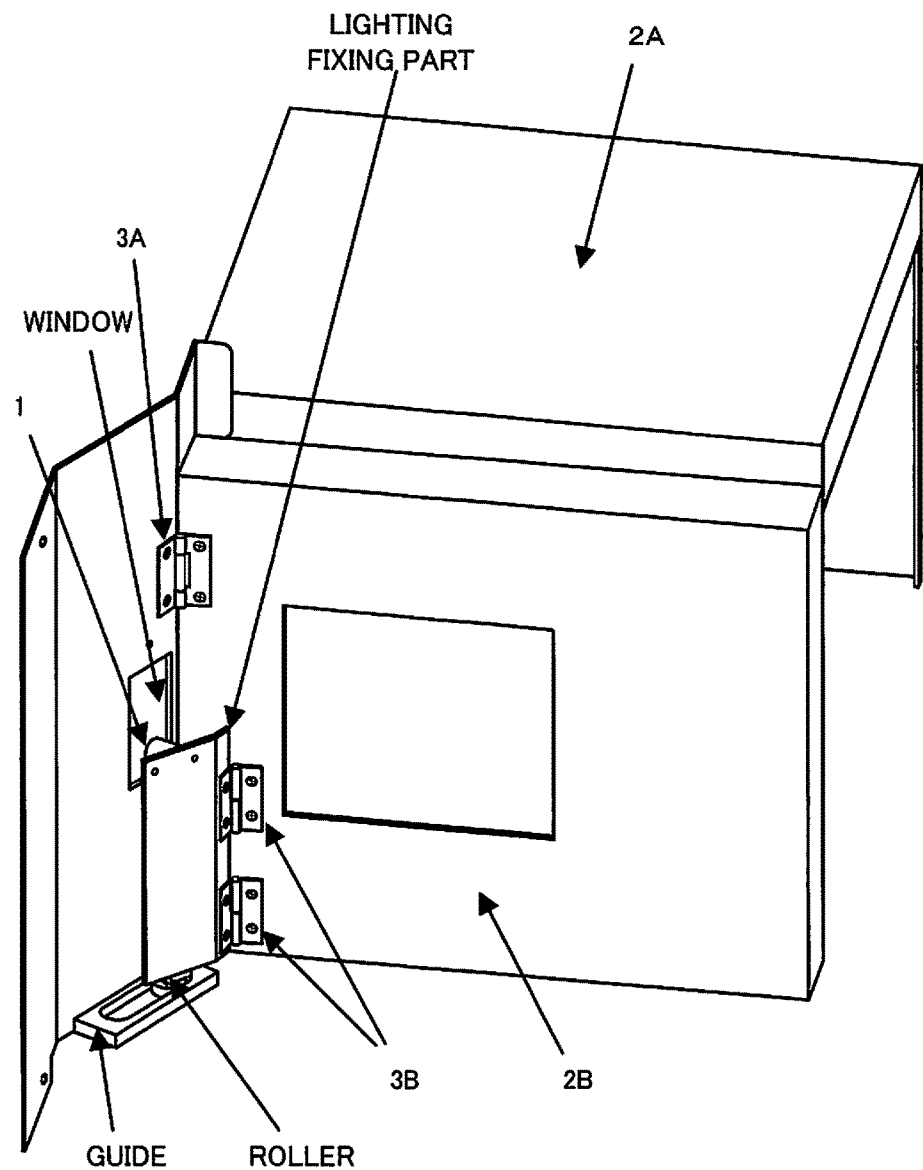
FIG. 4 is a diagram showing a resin scattering preventing cover and a lighting.
Figure 5:
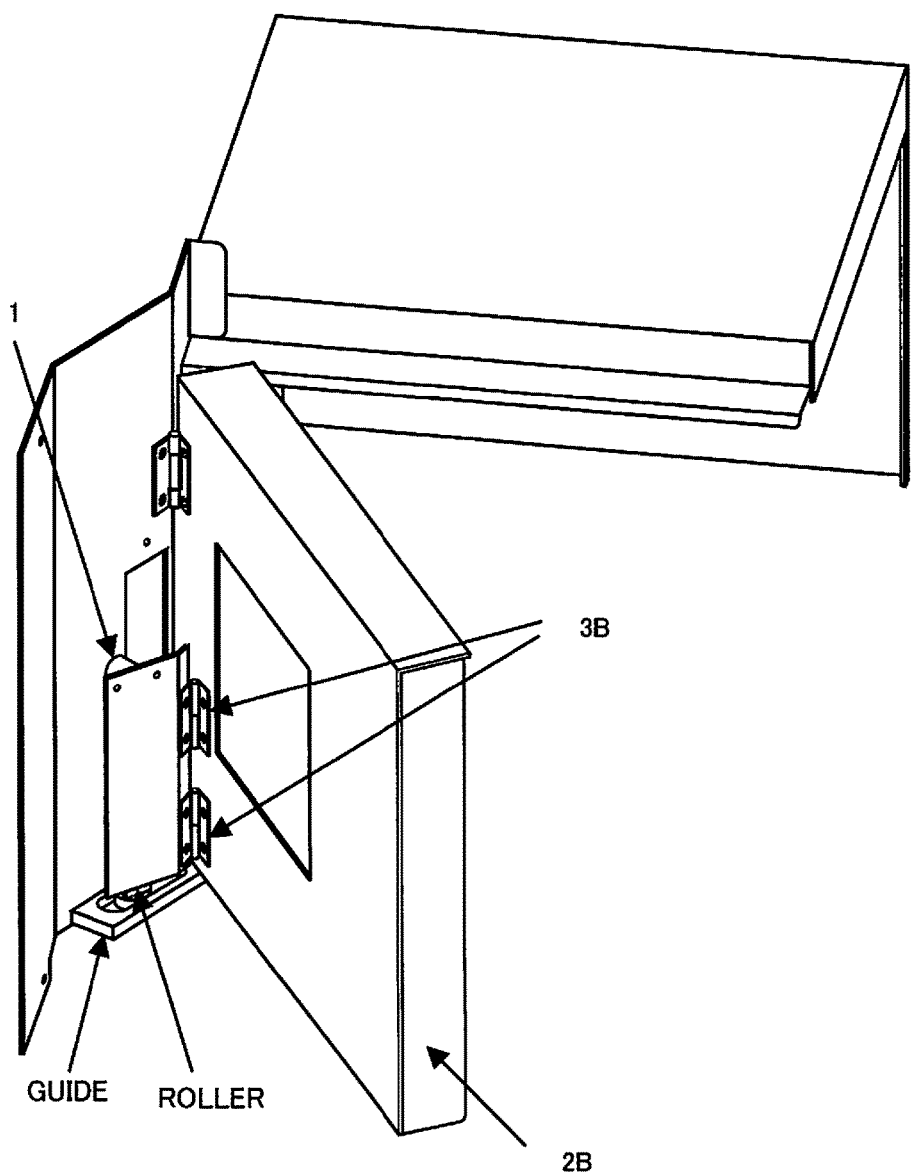
FIG. 5 is a diagram showing interlocking of opening/closing the resin scattering preventing cover and a lighting.

As shown in FIGS. 3, 4, and 5, resin scattering prevention covers 2A, 2B are attached to an injection molding machine. A lighting 1 fixed to a lighting fixing part is attached outside of the resin scattering prevention cover 2B, installed such that the resin scattering prevention cover 2B is opened and closed using a hinge 3A. Light of the lighting 1 is configured to lighten the mold touching portion and the interior portion of the resin scattering preventing cover 2B through a window having a transparent plate, installed in the resin scattering preventing cover 2B. When the lighting is attached in the direction the resin scattering preventing cover 2B opens, there is a case where the lighting prevent opening and closing of the resin scattering preventing cover 2B. However, the lighting 1 is attached movably to the resin scattering preventing cover 2B by connecting the lighting fixing part and the resin scattering preventing cover 2B using the hinge 3B, such that the lighting 1 is interlocked with the opening and closing of the resin scattering preventing cover 2B without preventing the opening and closing of the resin scattering preventing cover 2B. In addition to that, the lighting 1 is attached outside the resin scattering preventing cover, such that the lighting 1 is protected from the influence of the heat of the heating tube and the scattered resin ejected from the top end of the nozzle.

A roller is attached to the lighting fixing part and the roller is installed movably along a guide set in the resin scattering preventing cover, such that the lighting 1 moves along a track the operator intends, when the resin scattering preventing cover 2B is open and closed, as shown in FIGS. 4 and 5. In addition to that, movement of the lighting 1 is restrained by the guide, such that the lighting moves unintendedly while the resin scattering preventing cover 2B is closed and fixed.

Figure 6:
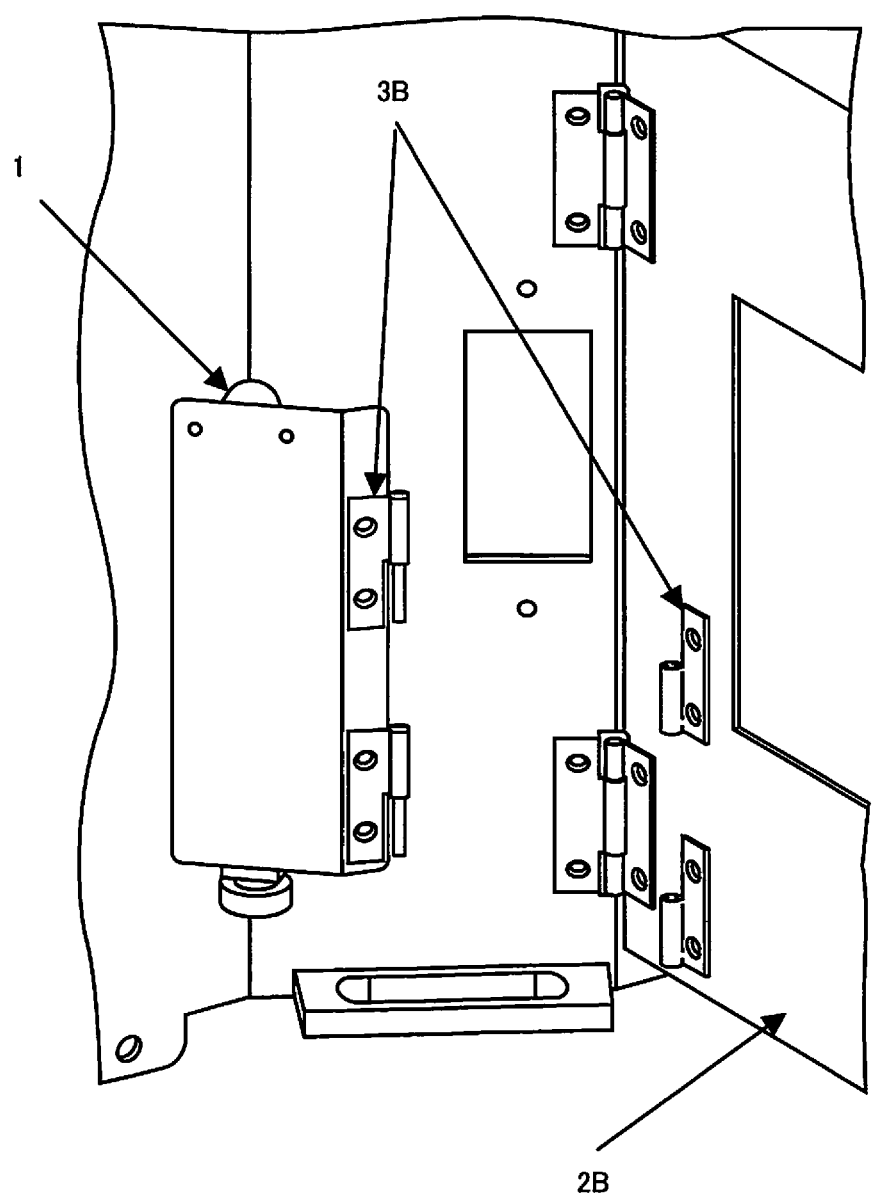
FIG. 6 is a diagram showing removal of the lighting.

Since the detachable hinge 3B is attached to the lighting 1 as shown in FIG. 6, the lighting attached to the resin scattering preventing cover 2B is easily removed. The lighting can be removed when the lighting prevents confirmation work of the mold touching unit and the interior portion of the resin scattering preventing cover by the operator, and the removed lighting 1 can lighten any part.

The lighting is configured to be turned on and off interlocking with the forward and backward motion of the injection unit, such that the touching portion of the top end of the nozzle to the mold is automatically lightened when touched, and it is prevented for the operator to turn off of the lighting.

The invention claimed is:

1. An injection molding machine, comprising:
   a resin scattering preventing cover configured to prevent resin scattering from an injection nozzle fixed to an end of an injection unit;
   a lighting unit configured to lighten molding contact portion where the injection nozzle and a mold contact;
   a fixing unit configured to fix the lighting unit;
   an opening/closing portion where the resin scattering prevention cover is configured to open and close;
   a guide unit configured to restrict a moving region of the lighting unit to an area other than the opening/closing portion of the resin scattering prevention cover; and
   a guided unit with which the lighting unit or the fixing unit guides the guide unit, wherein
   the fixing unit is connected interlocked with opening and closing of the opening/closing portion, and
   the guided unit is configured to be guided by the guide unit when the opening/closing portion is open or closed such that the fixing unit and the lighting unit are moved.

2. An injection molding machine according to claim 1, wherein the lighting unit is provided on outside part of the resin scattering preventing cover.

3. An injection molding machine according to claim 1, wherein the fixing unit and the opening/closing portion is disconnectably connected to each other.

4. An injection molding machine according to claim 1, comprising:
   a lighting and extinction command unit for commanding lighting and extinction of the lighting unit, configured to command lighting and extinction to the lighting unit inter-connectedly with back and forward motion of the injection unit.

\* \* \* \* \*